United States Patent
Pai et al.

(10) Patent No.: US 12,475,898 B2
(45) Date of Patent: Nov. 18, 2025

(54) TECHNOLOGIES FOR ENHANCING AUDIO QUALITY DURING LOW-QUALITY CONNECTION CONDITIONS

(71) Applicant: Intel Corporation, Santa Clara, CA (US)

(72) Inventors: Arun A. Pai, Bangalore (IN); Mahendran Rajendran, Bangalore (IN); Suganthi Balasubramanian, Bangalore (IN); Sajal Kumar Das, Bangalore (IN); Sean J.W. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 17/711,142

(22) Filed: Apr. 1, 2022

(65) Prior Publication Data

US 2022/0230643 A1    Jul. 21, 2022

(51) Int. Cl.
*G10L 19/005* (2013.01)
*G10L 15/183* (2013.01)
(Continued)

(52) U.S. Cl.
CPC .......... *G10L 19/005* (2013.01); *G10L 15/183* (2013.01); *G10L 15/22* (2013.01);
(Continued)

(58) Field of Classification Search
CPC ...... G06F 3/167; G06F 40/166; G06F 40/242; G06F 40/274; G06F 16/635;
(Continued)

(56) References Cited

U.S. PATENT DOCUMENTS

| | | | |
|---|---|---|---|
| 10,069,965 B2 * | 9/2018 | Karimi-Cherkandi | ....................... H04Q 3/0091 |
| 11,735,186 B2 * | 8/2023 | Zimmerman | ......... G06F 40/166 704/235 |

(Continued)

FOREIGN PATENT DOCUMENTS

| | | |
|---|---|---|
| EP | 3039803 A1 | 7/2016 |
| EP | 3613041 A1 | 2/2020 |
| WO | 2021047763 A1 | 3/2021 |

OTHER PUBLICATIONS

"How Fast Does the Average Person Speak?," Word Counter Every Word Counts; Jun. 2, 2016; accessed Apr. 22, 2022; https://wordcounter.net/blog/2016/06/02/101702_how-fast-average-person-speaks.html; 4 pages.

(Continued)

*Primary Examiner* — Gerald Gauthier
(74) *Attorney, Agent, or Firm* — Alliance IP, LLC

(57) ABSTRACT

Techniques for teleconferencing with enhanced audio during low-quality connection conditions are disclosed. In the illustrative embodiment, a user of a compute device is teleconferencing with users of one or more remote compute devices. The compute device monitors a connection quality with a remote compute device. If the connection quality drops below a threshold, risking gaps in the audio data, the compute device generates speech code data that can be used to fill in the gaps in the audio data. The remote compute device can use the speech code data to augment the audio data by using a voice model to create additional audio data based on the speech code data.

23 Claims, 6 Drawing Sheets

(51) Int. Cl.
*G10L 15/22* (2006.01)
*G10L 25/57* (2013.01)
*G10L 25/60* (2013.01)
*G10L 15/08* (2006.01)

(52) U.S. Cl.
CPC .............. *G10L 25/57* (2013.01); *G10L 25/60* (2013.01); *G10L 2015/088* (2013.01)

(58) Field of Classification Search
CPC ..... G06Q 10/0631; G10L 15/00; G10L 15/02; G10L 15/08; G10L 15/142; G10L 15/1815; G10L 15/183; G10L 15/197; G10L 15/22; G10L 17/22; G10L 17/24; G10L 19/0018; G10L 19/005; G10L 25/57; G10L 25/60; G10L 2015/088; G10L 13/02; G10L 13/047; G10L 15/04; G10L 15/30; G10L 21/02; H04L 1/20; H04M 3/2236; H04M 2201/39; H04M 2201/40; H04M 3/42391; H04M 3/493; A61B 5/7267; H04Q 3/0091
See application file for complete search history.

(56) References Cited

U.S. PATENT DOCUMENTS

| | | | | |
|---|---|---|---|---|
| 11,749,265 | B2* | 9/2023 | Doggett | G10L 15/22 704/235 |
| 2004/0192396 | A1* | 9/2004 | Fournier | H04M 3/493 455/445 |
| 2015/0066503 | A1* | 3/2015 | Achituv | G10L 15/197 704/235 |
| 2015/0100315 | A1* | 4/2015 | Bianco | H04M 3/42391 704/235 |
| 2015/0149159 | A1* | 5/2015 | Dimitriadis | H04M 3/2236 704/226 |
| 2015/0199966 | A1* | 7/2015 | Paulik | G06Q 10/06311 704/235 |
| 2015/0356968 | A1* | 12/2015 | Rice | G10L 21/02 704/251 |
| 2018/0090131 | A1* | 3/2018 | Mangalath | G10L 15/142 |
| 2018/0218727 | A1* | 8/2018 | Cutler | G10L 13/047 |
| 2018/0268815 | A1* | 9/2018 | Pande | G10L 15/02 |
| 2020/0357412 | A1* | 11/2020 | Robert Jose | G10L 15/1815 |
| 2021/0043210 | A1* | 2/2021 | Hughes | G10L 15/08 |
| 2022/0139395 | A1* | 5/2022 | Mutagi | G10L 17/22 704/235 |
| 2022/0180862 | A1* | 6/2022 | Sharifi | G10L 15/22 |
| 2022/0230632 | A1* | 7/2022 | Maitra | A61B 5/7267 |
| 2022/0230643 | A1* | 7/2022 | Pai | G10L 19/005 |
| 2023/0031056 | A1* | 2/2023 | Chinta | G06F 16/635 |
| 2023/0110205 | A1* | 4/2023 | Guo | G10L 15/197 704/235 |
| 2023/0115420 | A1* | 4/2023 | Dabas | G06F 3/167 704/235 |
| 2023/0125194 | A1* | 4/2023 | Mertens | G06F 40/166 704/235 |
| 2023/0142110 | A1* | 5/2023 | Kim | G10L 15/1815 704/235 |
| 2023/0169984 | A1* | 6/2023 | Rikhye | G10L 17/24 704/235 |

OTHER PUBLICATIONS

Min, Gang, et al., "An extreme low bit rate speech coding algorithm around 300bps," 2009 International Conference on Wireless Communications & Signal Processing, 2009, pp. 1-4, doi: 10.1109/WCSP.2009.5371427; 4 pages.

Vincent, James, "Lyrebird claims it can recreate any voice using just one minute of sample audio," The Verge; Apr. 24, 2017; accessed Apr. 22, 2022; https://www.theverge.com/2017/4/24/15406882/ai-voice-synthesis-copy-human-speech-lyrebird; 3 pages.

EPO; Extended European Search Report issued in EP Patent Application No. 23157081.3, dated Aug. 22, 2023; 7 pages.

* cited by examiner

TECHNOLOGIES FOR ENHANCING AUDIO QUALITY DURING LOW-QUALITY CONNECTION CONDITIONS

BACKGROUND

Audio and video conferencing is a common way to communicate online. With a high-quality connection, users of remote compute devices can experience good communication. However, with a low-quality connection, users may experience loss of video and loss of audio, inhibiting communication.

DETAILED DESCRIPTION

Figure 1:
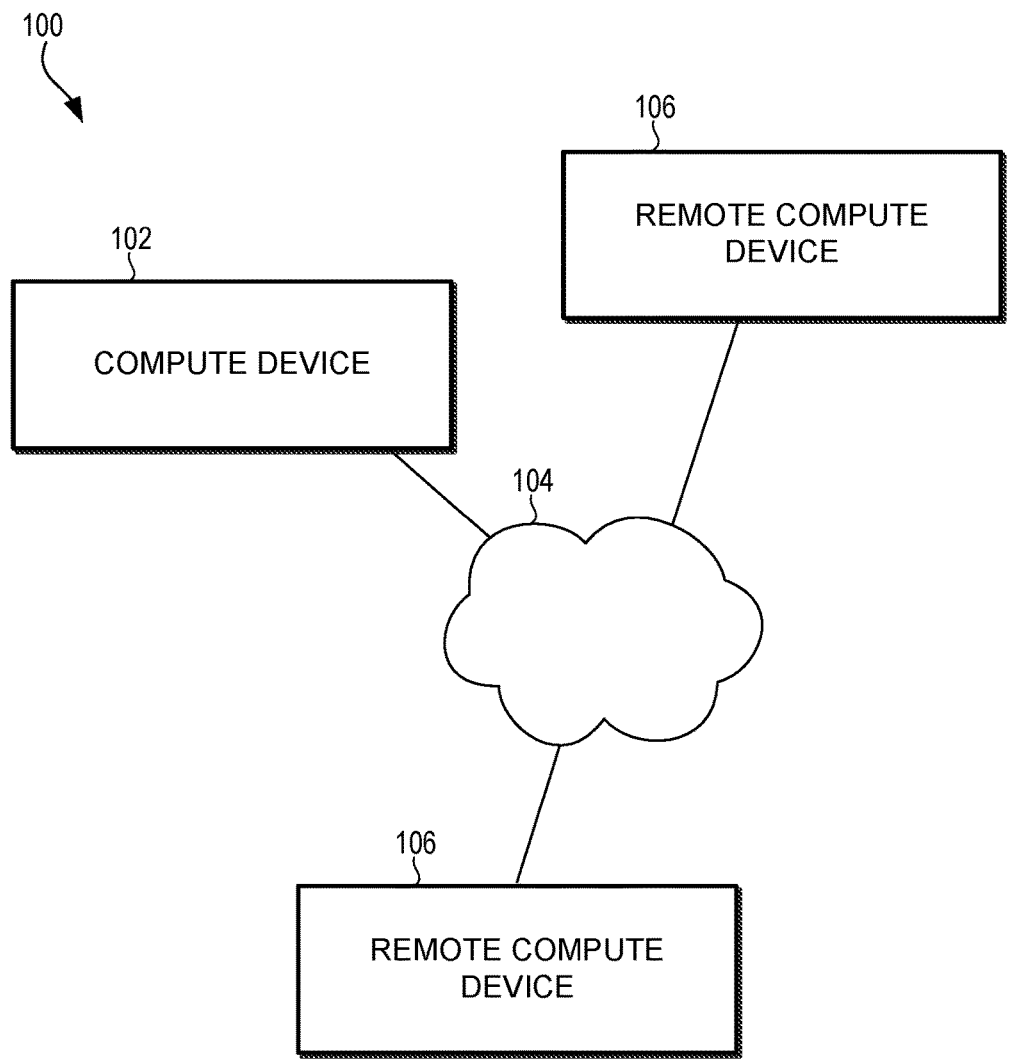
FIG. 1 is a simplified block diagram of a system for teleconferencing.

While a user of a local compute device is teleconferencing with a user of a remote compute device, a low-quality connection may cause gaps or distortion in received video or audio data, leading to poor communication. In the illustrative embodiment, when a low-quality connection is detected, the local compute device generates speech code data based on the audio or speech data, such as by using automatic speech recognition and converting speech to ASCII or other text format. The speech code data can be sent in addition to or instead of the audio or speech data. As the speech code data consumes lower channel bandwidth than the audio data, the speech code data may be able to be sent even over a relatively poor connection.

The remote compute device can receive the audio data and/or speech code data. When gaps or high distortion in the audio data are detected due to, e.g., dropped packets or erroneously received packets, the speech code data may be used to augment the audio data and fill in the gaps, replace the erroneously received packets, or combine with the erroneously received packets in order to improve the audio quality. The remote compute device may use a voice model based on the user of the local compute device to generate audio data that sounds like the user of the local compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for teleconferencing includes one or more compute devices 102 connected by a network 104. The compute devices 102 may be embodied as, e.g., cell phones, laptop computers, desktop computers, tablets, and/or the like. The network may be embodied as a local network, the Internet, a cellular network, and/or the like. The system 100 may include two compute devices 102 communicating with each other or may include three or more compute devices 102 in a teleconference. The system 100 may be embodied as two cell phones communicating over a cellular voice channel. In use, when a low-quality connection is detected, a compute device 102 transmitting audio data may additionally or alternatively send speech code data, such as by performing automatic speech recognition. The speech code data, which may be, e.g., text or speech data encoded using a speech codec, requires less bandwidth than the audio data. The receiving compute device 102 can then generate voice data corresponding to the speech code data to fill in any gaps in the audio data.

In the illustrative embodiment, a user's speaking is captured by a transmitter compute device 102, and it is the transmitter compute device 102 that generates the speech code data from the audio data, when appropriate. The transmitter compute device 102 then sends the speech code data, where it is received by a receiver compute device 102 and used to augment the audio data and played for a user of the receiver compute device 102. Additionally or alternatively, an intermediate compute device 102 may generate the speech code data and/or augment the audio data.

For example, a connection from a transmitter compute device 102 to an intermediate compute device 102 may be high-quality, but the connection from the intermediate compute device 102 may be low-quality. In such an embodiment, the transmitter compute device 102 may send the full audio data to the intermediate compute device 102, and the intermediate compute device 102 may generate speech code data to send to the receiver compute device 102. In another example, a connection from a transmitter compute device 102 to an intermediate compute device 102 may be low-quality, but the connection from the intermediate compute device 102 may be high-quality. In such an embodiment, the transmitter compute device 102 may generate speech code data, and the intermediate compute device 102 may augment the audio data based on the speech code data and send the augmented audio data to the receiver compute device 102, with or without the speech code data. The intermediate compute device 102 may be, e.g., a server computer, an edge node, a cloud computer, a node in a mesh or ad-hoc network, and/or any other suitable compute device 102.

Figure 2:
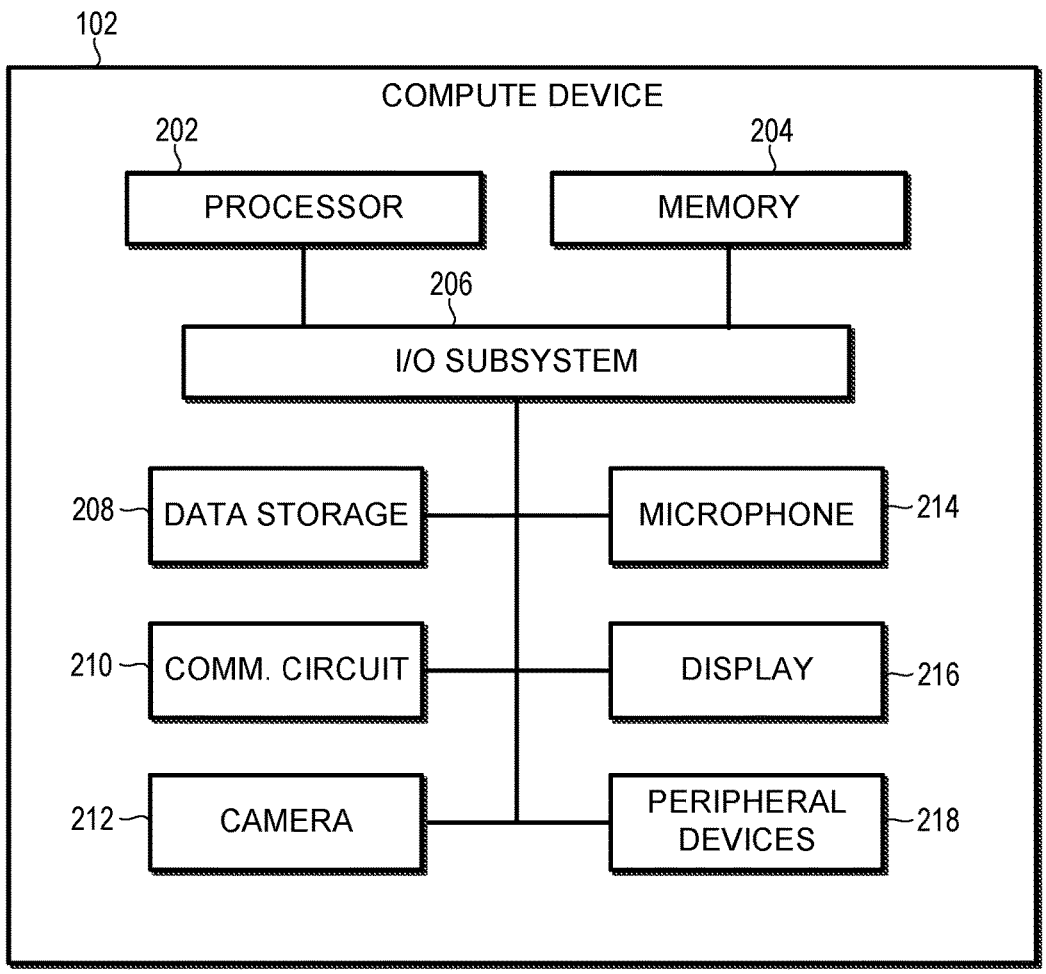
FIG. 2 is a simplified block diagram of at least one embodiment of a compute device for teleconferencing with enhanced audio quality.

Referring now to FIG. 2, in one embodiment, a compute device 102 for teleconferencing is shown. The compute device 102 may be embodied as any type of compute device. For example, the compute device 102 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other compute device. In some embodiments, the compute device 102 may be located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

The illustrative compute device 102 includes a processor 202, a memory 204, an input/output (I/O) subsystem 206, data storage 208, a communication circuit 210, a camera 212, a microphone 214, a display 216, and one or more peripheral devices 218. In some embodiments, one or more of the illustrative components of the compute device 102 may be incorporated in, or otherwise form a portion of, another component. For example, the memory 204, or portions thereof, may be incorporated in the processor 202 in some embodiments. In some embodiments, one or more of the illustrative components may be physically separated from another component.

The processor 202 may be embodied as any type of processor capable of performing the functions described herein. For example, the processor 202 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 206 may connect various internal and external components of the compute device 102 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 206 may form a portion of a system-on-a-chip (SoC) and be incorporated, along with the processor 202, the memory 204, and other components of the compute device 102 on a single integrated circuit chip.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The communication circuit 210 may be embodied as any type of interface capable of interfacing the compute device 102 with other compute devices, such as over one or more wired or wireless connections. In some embodiments, the communication circuit 210 may be capable of interfacing with any appropriate cable type, such as an electrical cable or an optical cable. The communication circuit 210 may be configured to use any one or more communication technology and associated protocols (e.g., Ethernet, Bluetooth®, Wi-Fi®, WiMAX, near field communication (NFC), etc.). The communication circuit 210 may be located on silicon separate from the processor 202, or the communication circuit 210 may be included in a multi-chip package with the processor 202, or even on the same die as the processor 202. The communication circuit 210 may be embodied as one or more add-in-boards, daughtercards, network interface cards, controller chips, chipsets, specialized components such as a field-programmable gate array (FPGA) or application-specific integrated circuit (ASIC), or other devices that may be used by the compute device 202 to connect with another compute device. In some embodiments, communication circuit 210 may be embodied as part of a system-on-a-chip (SoC) that includes one or more processors or included on a multichip package that also contains one or more processors. In some embodiments, the communication circuit 210 may include a local processor (not shown) and/or a local memory (not shown) that are both local to the communication circuit 210. In such embodiments, the local processor of the communication circuit 210 may be capable of performing one or more of the functions of the processor 202 described herein. Additionally or alternatively, in such embodiments, the local memory of the communication circuit 210 may be integrated into one or more components of the compute device 202 at the board level, socket level, chip level, and/or other levels.

The camera 212 may be any suitable camera that can capture image or video. The camera 212 may include one or more fixed or adjustable lenses and one or more image sensors. The image sensors may be any suitable type of image sensors, such as a CMOS or CCD image sensor. The camera 212 may have any suitable aperture, focal length, field of view, etc. For example, the camera 212 may have a field of view of 60-110° in the azimuthal and/or elevation directions.

The microphone 214 is configured to sense sound waves and output an electrical signal indicative of the sound waves. In the illustrative embodiment, the compute device 102 may have more than one microphone 214, such as an array of microphones 214 in different positions.

The display 216 may be embodied as any type of display on which information may be displayed to a user of the compute device 102, such as a touchscreen display, a liquid crystal display (LCD), a thin film transistor LCD (TFT-LCD), a light-emitting diode (LED) display, an organic light-emitting diode (OLED) display, a cathode ray tube (CRT) display, a plasma display, an image projector (e.g., 2D or 3D), a laser projector, a heads-up display, and/or other display technology. The display 216 may have any suitable resolution, such as 7680×4320, 3840×2160, 1920×1200, 1920×1080, etc.

In some embodiments, the compute device 102 may include other or additional components, such as those commonly found in a compute device. For example, the compute device 102 may also have peripheral devices 218, such as a keyboard, a mouse, a speaker, an external storage device, a battery, etc. In some embodiments, the compute device 102 may be connected to a dock that can interface with various devices, including peripheral devices 218.

Figure 3:
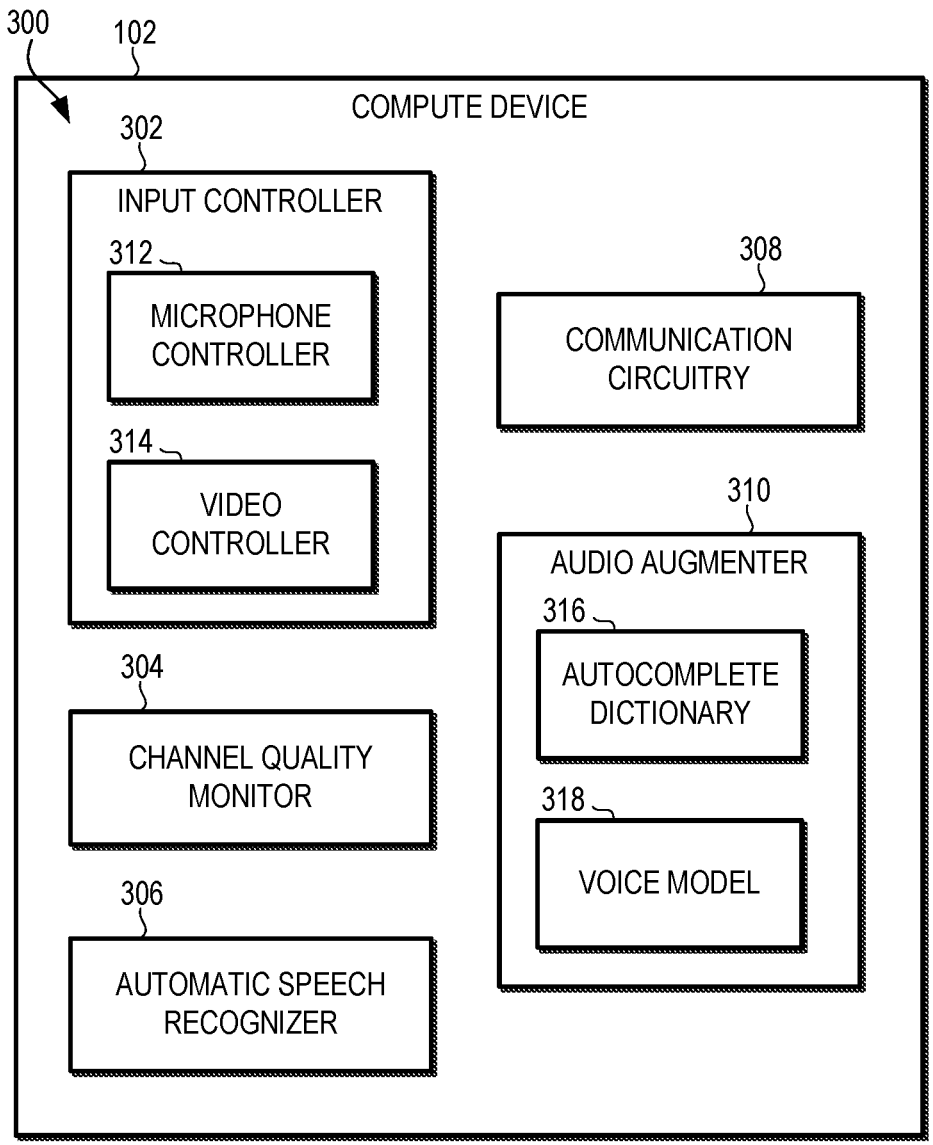
FIG. 3 is a simplified block diagram of at least one embodiment of an environment that may be established by the compute device of FIG. 1.

Referring now to FIG. 3, in an illustrative embodiment, the compute device 102 establishes an environment 300 during operation. The illustrative environment 300 includes input controller 302, connection quality monitor 304, automatic speech recognizer 306, communication circuitry 308, and audio augmenter 310. The various modules of the environment 300 may be embodied as hardware, software, firmware, or a combination thereof. For example, the various modules, logic, and other components of the environment 300 may form a portion of, or otherwise be established by, the processor 202, the memory 204, the data storage 208, or other hardware components of the compute device 102. As such, in some embodiments, one or more of the modules of the environment 300 may be embodied as circuitry or collection of electrical devices (e.g., input controller circuitry 302, connection quality monitor circuitry 304, automatic speech recognizer circuitry 306, etc.). It should be appreciated that, in such embodiments, one or more of the circuits (e.g., the input controller circuitry 302, the connection quality monitor circuitry 304, the automatic speech recognizer circuitry 306, etc.) may form a portion of one or more of the processor 202, the memory 204, the I/O subsystem 206, the data storage 208, and/or other components of the compute device 102. For example, in some embodiments, some or all of the modules may be embodied as the processor 202 as well as the memory 204 and/or data storage 208 storing instructions to be executed by the processor 202. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 202 or other components of the compute device 102. It should be appreciated that some of the functionality of one or more of the modules of the environment 300 may require a hardware implementation, in which case embodiments of modules that implement such functionality will be embodied at least partially as hardware.

The input controller 302, which may be embodied as hardware, firmware, software, virtualized hardware, emulated architecture, and/or a combination thereof, as discussed above, is configured to receive data from the microphone 214 or other audio input and the camera 212. The input controller 302 includes a microphone controller 312 to receive input from the microphone 214 and a video controller 314 to receive input from the camera 212.

The connection quality monitor 304 is to monitor a connection quality of a connection between the compute device 102 and a remote compute device 106. The connection quality monitor 304 may determine the quality of the connection on any suitable metric, such as packet loss, bit error rate (BER), word error rate, frame error rate (FER), packet transmission rate, audio data sent by the remote compute device 106 that is lost, etc.

The automatic speech recognizer 306 is configured to perform automatic speech recognition on audio data received by the input controller 302 to generate speech code data. The automatic speech recognizer 306 may perform automatic speech recognition on all audio data or may only perform automatic speech recognition when the connection quality is below a threshold. The speech code data may be embodied as text corresponding to the audio data, or the automatic speech recognition may apply a speech codec to otherwise encode the speech data. The compute device 102 may generate speech code data at any suitable data rate, such as 100-3,000 bits per second. If the speech code data is embodied as text, in one embodiment, the compute device 102 may generate text at a rate of, e.g., 120 bits per second.

The communication circuitry 308 is configured to communicate with other compute devices 102. The communication circuitry 308 may implement any suitable protocols, such as Wi-Fi, Ethernet, IP, TCP, UDP, RTP, etc. The communication circuitry 308 may be used to send speech code data generated by the automatic speech recognizer 306 to a remote compute device 106. In some embodiments, the communication circuitry 308 may send the speech code data with a high amount of redundancy, such as by sending several packets encoded with error correction or sending the same speech code data in several different packets. Additionally or alternatively, in some embodiments, the communication circuitry 308 may receive audio data and/or speech code data from the remote compute device 106.

The audio augmenter 310 is configured to augment audio data received from the remote compute device 106 by the communication circuitry 308. The audio augmenter 310 identifies one or more gaps in the audio data and uses a voice model 318 to generate audio data with a similar voice to that of the user of the remote compute device 106. The voice model 318 may be created by, e.g., generating a voice model based on past audio data, accessing a voice model corresponding to the speaker, etc. The voice model 318 may use artificial intelligence or other machine-learning-based algorithms to create audio data based on the speech code data and to update parameters of the voice model 318 based on received audio data In some embodiments, the audio augmenter 310 identifies one or more keywords in the audio data or in the speech code data. The audio augmenter 310 may use artificial intelligence or other machine-learning-based algorithms to identify keywords in the audio data. Keywords may be used to update an autocomplete dictionary 316 or identify a topic or field for the autocomplete dictionary 316.

The autocomplete dictionary 316 may be used to fill in gaps, particularly when there is a gap in both the audio data and the speech code data. The autocomplete dictionary 316 may project the next word or words that the user will speak based on previous words the user spoke. The autocomplete dictionary may use artificial intelligence or other machine-learning-based algorithms to determine how to fill in gaps. The autocomplete dictionary 316 may use the keywords to determine how gaps should be filled. The autocomplete dictionary 316 may be updated based on the audio data and/or the speech code data. For example, a particular word or phrase that the speaker has used may be indicated in the autocomplete dictionary to be a common word or phrase for that speaker or topic.

In cases where audio data and speech code data are sent for overlapping time periods, the audio augmenter 310 may combine the audio data and the speech code data to produce the augmented audio data. The audio augmenter 310 may use any suitable combining algorithm, such as a simple averaging combining method, a weight-based combining method, or an iterative correction method.

Figure 4:
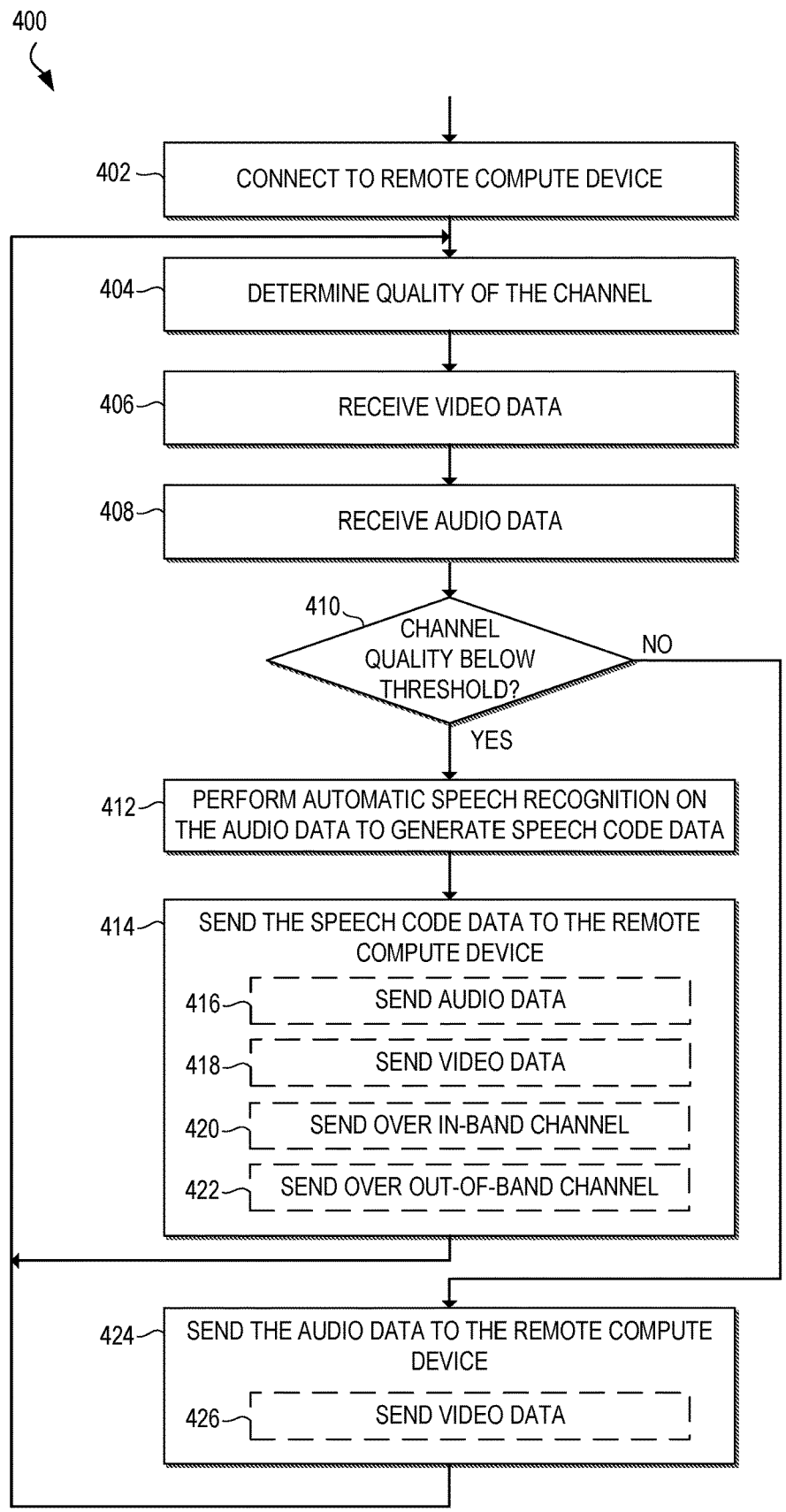
FIG. 4 is a simplified flow diagram of at least one embodiment of a method for sending speech code data to a remote compute device.

Referring now to FIG. 4, in use, the compute device 102 may execute a method 400 for sending speech code data to a remote compute device 106. The method 400 begins in block 402, in which the compute device 102 connects to a remote compute device 106, such as by a user of the compute device 102 launching an application, making a phone call, joining a teleconference, etc.

In block 404, the compute device 102 determines a quality of the connection between the compute device 102 and the remote compute device 106. The compute device 102 may determine the quality of the connection on any suitable metric, such as packet loss, bit error rate, word error rate, frame error rate, packet transmission rate, etc. In the illustrative embodiment, the compute device 102 determines the quality of the connection based on data available at the compute device 102. Additionally or alternatively, in some embodiments, the compute device 102 may receive an indication of a quality of the connection from the remote compute device 106. The remote compute device 106 may determine a quality of the connection in any suitable manner, such as packet loss, bit error rate, word error rate, frame error rate, packet transmission rate, and gaps in audio or video data from the compute device 102. In some embodiments, an intermediary compute device may determine a quality of the audio connection and send an indication of a quality of the connection to the compute device 102. The intermediary compute device may be, e.g., a network server or other network device that is in a data pathway between the compute device 102 and the remote compute device 106. In some embodiments, such as embodiments with multiple remote compute devices 102 receiving data from the compute device 102, the compute device 102 may determine a connection quality of a connection to each of the remote compute devices 102. The compute device 102 may send speech code data to any or all of the remote compute devices 102 based on the quality of a connection of any of the remote compute devices.

In block 406, the compute device 102 receives video data of the user of the compute device 102 from the camera 212. In some embodiments, the compute device 102 may have the camera 212 off, or the compute device 102 may not have a camera 212, in which case the compute device 102 will not receive video data. In block 408, the compute device 102 receives audio data of the user of the compute device 102 from the microphone 214 or other audio input. In some embodiments, the compute device 102 may access recorded or streamed audio.

In block 408, if the connection quality determined in block 404 is below a threshold, the method proceeds to block 412, in which the compute device 102 performs automatic speech recognition on the audio data to generate speech code data. The speech code data may be embodied as text corresponding to the audio data, or the automatic speech recognition may apply a speech codec to otherwise encode the speech data. The compute device 102 may generate speech code data at any suitable data rate, such as 100-3,000 bits per second. If the speech code data is embodied as text, in one embodiment, the compute device 102 may generate text at a rate of, e.g., 120 bits per second.

In block 414, the compute device 102 sends the speech code data to the remote compute device 106. In order to allow the remote compute device 106 to synchronize the speech code data, the compute device 102 may include one or more timestamps along with the speech code data. The compute device 102 may send the speech code data for a particular amount of time, such as 20 milliseconds. More generally, the compute device 102 may send the speech code data (and/or audio data) for any suitable amount of time, such as 5-200 milliseconds). In some embodiments, the compute device 102 may send the speech code data with a high amount of redundancy, such as by sending several packets encoded with error correction or sending the same speech code data in several different packets.

In block 416, in some embodiments, the compute device 102 may send the audio data in addition to the speech code data. Depending on the embodiment, the compute device 102 may supplement the speech code data by always sending the audio data, sometimes sending the audio data depending on the connection quality, or never sending the audio data.

In block 418, in some embodiments, the compute device 102 may send the video data. Depending on the embodiment, the compute device 102 may always send the video data, may never send the video data when the speech code data is sent, or may sometimes send the speech code data and the video data, depending on the connection quality.

In block 420, in some embodiments, the speech code data is sent in-band with the connection used to send audio data. For example, the speech code data may be sent using the Real-time Transport Protocol (RTP), with a reserved bit acting as a flag to indicate the presence of the speech code data. The speech code data may be included in addition to or instead of audio data.

In block 422, in some embodiments, the speech code data is sent in an out-of-band connection, such as a UDP, RTP, or other connection different from the one used to send audio data. After sending the speech code data, the method loops back to block 404 to determine the quality of the connection.

Referring back to block 410, if the connection quality is not below the threshold, the method 400 jumps to block 424, in which the compute device 102 sends the audio data to the remote compute device 106. In some embodiments, the compute device 102 may also send video data in block 426. The method 400 then loops back to block 404 to determine the quality of the connection.

Figure 5:
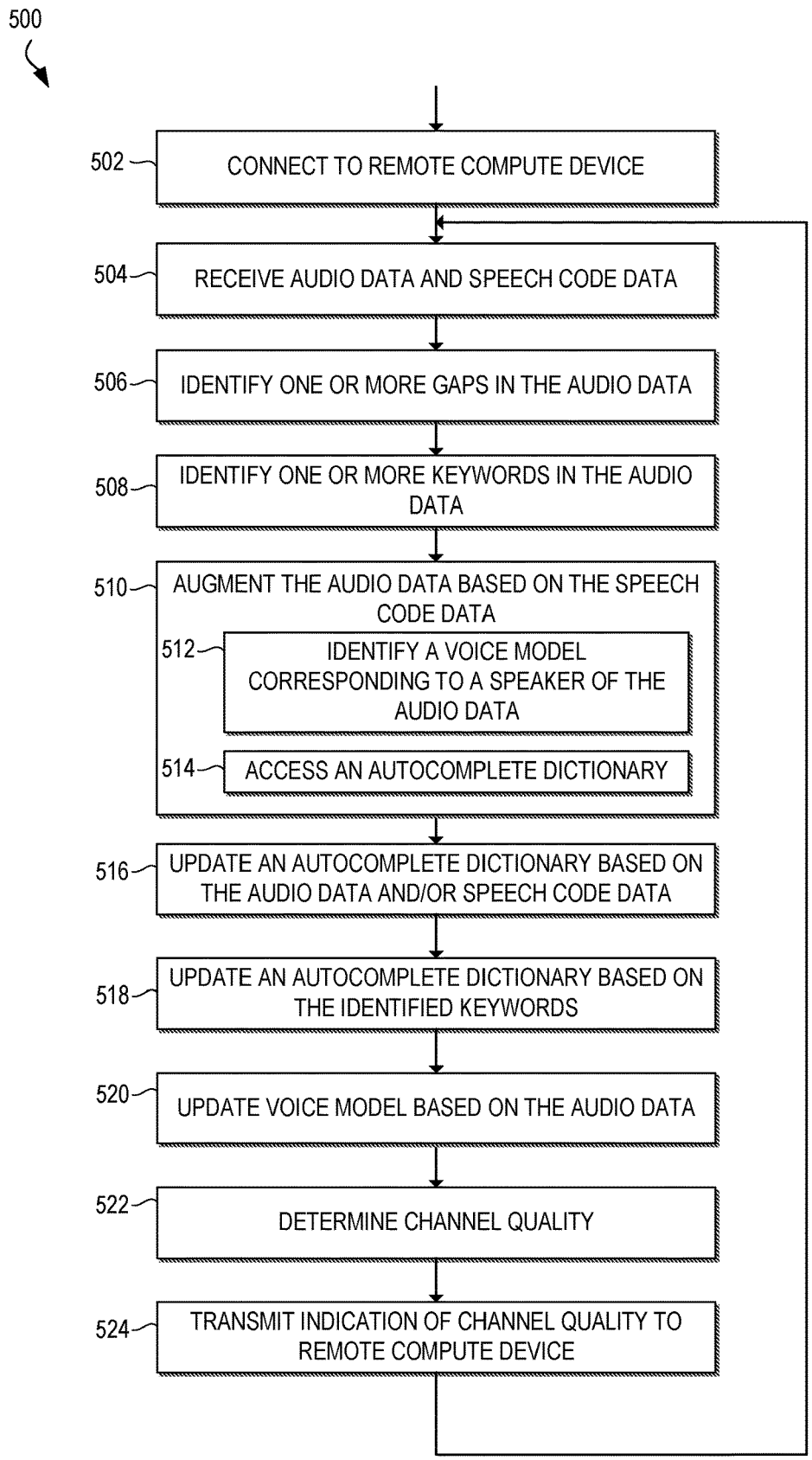
FIG. 5 is a simplified flow diagram of at least one embodiment of a method for receiving speech code data from a remote compute device.

Referring now to FIG. 5, in use, the compute device 102 may execute a method 500 for receiving speech code data from a remote compute device 106. The method 500 begins in block 502, in which the compute device 102 connects to a remote compute device 106, such as by a user of the compute device 102 launching an application, making a phone call, joining a teleconference, etc.

In block 504, the compute device 102 receives audio data and speech code data. The audio data and speech code data may correspond to different times. For example, the compute device 102 may receive 500 milliseconds of audio data and 500 milliseconds speech code data corresponding to one full second of speech by the user of the remote compute device 106. In some cases, the audio data and speech code data may refer to overlapping times.

In block 506, the compute device 102 identifies one or more gaps in the audio data.

In block 508, the compute device 102 identifies one or more keywords in the audio data or in the speech code data. The compute device 102 may use artificial intelligence or other machine-learning-based algorithms to identify keywords in the audio data.

In block 510, the compute device 102 augments the audio data based on the speech code data. In the illustrative embodiment, the compute device 102 identifies a voice model corresponding to the speaker of the audio data in block 512. The compute device 102 may identify a voice model by, e.g., generating a voice model based on past audio data, accessing a voice model corresponding to the speaker, etc. The voice model and the algorithm for generating audio data using the voice model may use artificial intelligence or other machine-learning-based algorithms. In block 514, the compute device 102 may access an autocomplete dictionary. The autocomplete dictionary may be used to fill in gaps, particularly when there is a gap in both the audio data and the speech code data. The autocomplete dictionary may project the next word or words that the user will speak based on previous words the user spoke. The autocomplete dictionary may use artificial intelligence or other machine-learning-based algorithms. The autocomplete dictionary may use the keywords identified in block 508 to determine how gaps should be filled. For example, the keywords may be used to identify a particular topic or field of discussion, and the autocomplete dictionary may fill in gaps in the audio data and/or speech code data based on the identified topic or field. Additionally or alternatively, the topic or field of discussion may be determined based on, e.g., intended topics to be discussed, meeting participants, etc.

The compute device 102 may use the speech code data, the autocomplete dictionary, and the voice model to create additional audio data that fills in the gaps identified in the audio data. In cases where audio data and speech code data are sent for overlapping time periods, the audio data and the speech code data may be combined to produce the augmented audio data. The compute device 102 may use any suitable combining algorithm, such as a simple averaging combining method or an iterative correction method.

In block 516, the autocomplete dictionary may be updated based on the audio data and/or the speech code data. For example, a particular word or phrase that the speaker has used may be indicated in the autocomplete dictionary to be a common word or phrase for that speaker or topic.

In block 518, the autocomplete dictionary may be updated based on the identified keywords. For example, the keywords may be used to identify a particular topic or field of discussion, and the autocomplete dictionary may be updated accordingly.

In block 520, the compute device 102 updates the voice model of the speaker based on the audio data.

In block 522, the compute device 102 determines a quality of the connection between the compute device 102 and the remote compute device 106. The compute device 102 may determine the quality of the connection on any suitable metric, such as packet loss, bit error rate, word error rate, frame error rate, packet transmission rate, gaps in audio or video data from the remote compute device 106, etc. In the illustrative embodiment, the compute device 102 determines the quality of the connection based on data available at the compute device 102. In block 524, the compute device 102 transmits an indication of the connection quality to the remote compute device 106. The method 500 then loops back to block 504 to receive additional audio data and speech data.

Figure 6:
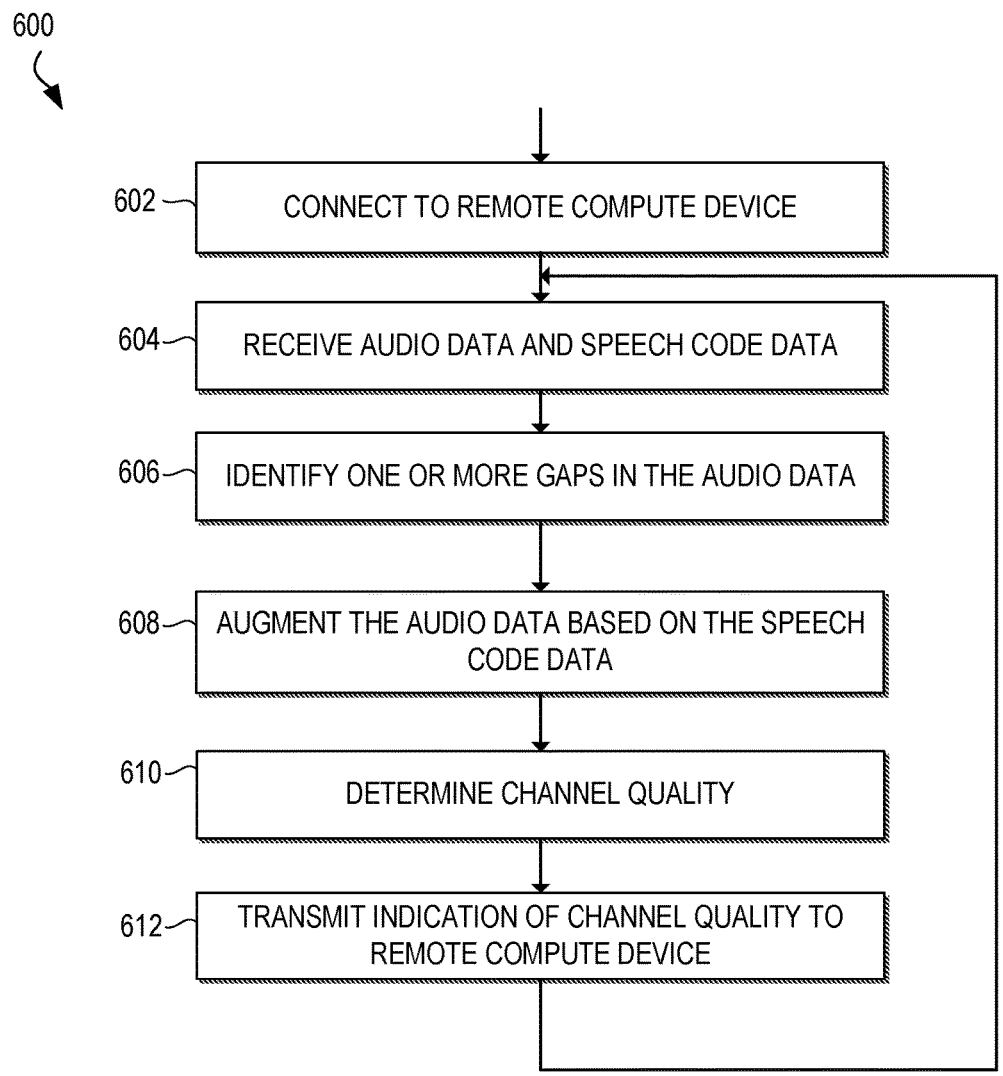
FIG. 6 is a simplified flow diagram of at least one embodiment of a method for receiving speech code data from a remote compute device.

Referring now to FIG. 6, in use, the compute device 102 may execute a method 600 for receiving speech code data from a remote compute device 106. The method 600 begins in block 602, in which the compute device 102 connects to a remote compute device 106, such as by a user of the compute device 102 launching an application, making a phone call, joining a teleconference, etc.

In block 604, the compute device 102 receives audio data and speech code data. The audio data and speech code data may correspond to different times. For example, the compute device 102 may receive 500 milliseconds of audio data and 500 milliseconds speech code data corresponding to one full second of speech by the user of the remote compute device 106. In some cases, the audio data and speech code data may refer to overlapping times.

In block 606, the compute device 102 identifies one or more gaps in the audio data.

In block 608, the compute device 102 augments the audio data based on the speech code data. The compute device 102 may use the speech code data to create additional audio data that fills in the gaps identified in the audio data by synthesizing audio that sounds like the speaker at the remote compute device 106. In cases where audio data and speech code data are sent for overlapping time periods, the audio data and the speech code data may be combined to produce the augmented audio data. The compute device 102 may use any suitable combining algorithm, such as a simple averaging combining method or an iterative correction method.

In block 610, the compute device 102 determines a quality of the connection between the compute device 102 and the remote compute device 106. The compute device 102 may determine the quality of the connection on any suitable metric, such as packet loss, bit error rate, word error rate, frame error rate, packet transmission rate, gaps in audio or video data from the remote compute device 106, etc. In the illustrative embodiment, the compute device 102 determines the quality of the connection based on data available at the compute device 102. In block 612, the compute device 102 transmits an indication of the connection quality to the remote compute device 106. The method 600 then loops back to block 604 to receive additional audio data and speech data.

EXAMPLES

Illustrative examples of the technologies disclosed herein are provided below. An embodiment of the technologies may include any one or more, and any combination of, the examples described below.

Example 1 includes a compute device comprising one or more processors; a memory device coupled to the one or more processors comprising thereon a plurality of instructions that, when executed, causes the one or more processors to receive audio data of a user from an audio input; and perform automatic speech recognition on the audio data to generate speech code data corresponding to the audio data, send the speech code data to a remote compute device.

Example 2 includes the subject matter of Example 1, and wherein the plurality of instructions further cause the one or more processors to determine a quality of a connection between the compute device and the remote compute device; and determine whether the quality of the connection is below a threshold, wherein to perform automatic speech recognition on the audio data comprises to perform automatic speech recognition on the audio data in response to a determination that the quality of the connection is below the threshold.

Example 3 includes the subject matter of any of Examples 1 and 2, and wherein to determine the quality of the connection comprises to receive an indication of the quality of the connection from the remote compute device.

Example 4 includes the subject matter of any of Examples 1-3, and wherein to determine whether the quality of the connection is below a threshold comprises to determine whether the quality of the connection is below a threshold at a first time frame, wherein the plurality of instructions further cause the one or more processors to receive additional audio data of the user from the audio input; determine a quality of the connection at a second time frame different from the first, wherein the audio data is received at a time corresponding to the first time frame, wherein the additional audio data is received at a time corresponding to the second time frame; determine whether the quality of the connection at the second time frame is below a threshold; and send the additional audio data without corresponding speech code data and an indication of a presence of the additional audio data in response to a determination that the quality of the connection at the second time frame is not below the threshold.

Example 5 includes the subject matter of any of Examples 1-4, and wherein the speech code data comprises text corresponding to the audio data.

Example 6 includes the subject matter of any of Examples 1-5, and wherein to send the speech code data to the remote compute device comprises to send the audio data and the speech code data to the remote compute device.

Example 7 includes the subject matter of any of Examples 1-6, and wherein to send the audio data and the speech code data to the remote compute device wherein to send the audio data in a primary connection and the speech code data in an out-of-band connection different from the primary connection.

Example 8 includes the subject matter of any of Examples 1-7, and wherein to send the audio data and the speech code data to the remote compute device wherein to send the audio data and the speech code data in the same connection.

Example 9 includes the subject matter of any of Examples 1-8, and wherein to send the audio data and the speech code data to the remote compute device comprises to send the audio data with a first amount of redundancy and the speech code data with a second amount of redundancy, wherein the second amount of redundancy is greater than the first amount of redundancy.

Example 10 includes the subject matter of any of Examples 1-9, and wherein the plurality of instructions further cause the one or more processors to receive video data of the user, wherein to send the speech code data to a remote compute device comprises to send the speech code data and the video data to the remote compute device.

Example 11 includes the subject matter of any of Examples 1-10, and wherein to perform automatic speech recognition on the audio data comprises to apply a speech codec to generate speech code data at a data rate less than 500 bits per second.

Example 12 includes a compute device comprising one or more processors; a memory device coupled to the one or more processors comprising thereon a plurality of instructions that, when executed, causes the one or more processors to receive, from a remote compute device, audio data and speech code data; identify one or more gaps in the audio data; and augment the audio data based on the speech code data to fill the one or more gaps in the audio data.

Example 13 includes the subject matter of Example 12, and wherein the speech code data is incomplete, wherein to augment the audio data based on the speed code data comprises to access an autocomplete dictionary to augment the incomplete speech code data.

Example 14 includes the subject matter of any of Examples 12 and 13, and wherein the plurality of instructions further cause the one or more processors to update the autocomplete dictionary based on the audio data, the speech code data, or both.

Example 15 includes the subject matter of any of Examples 12-14, and wherein to access the autocomplete dictionary comprises to access the autocomplete dictionary based on one or more keywords identified in the audio data, the speech code data, or both.

Example 16 includes the subject matter of any of Examples 12-15, and wherein the plurality of instructions further cause the one or more processors to update the autocomplete dictionary based on the one or more identified keywords.

Example 17 includes the subject matter of any of Examples 12-16, and wherein the plurality of instructions further cause the one or more processors to determine a quality of a connection between the compute device and the remote compute device; and transmit an indication of the quality of the connection to the remote compute device.

Example 18 includes the subject matter of any of Examples 12-17, and wherein the speech code data comprises text corresponding to the one or more gaps in the audio data.

Example 19 includes the subject matter of any of Examples 12-18, and wherein the plurality of instructions further cause the one or more processors to identify a voice model corresponding to a speaker of the audio data and the speech code data, wherein to augment the audio data based on the speech code data comprises to augment the audio data based on the voice model.

Example 20 includes the subject matter of any of Examples 12-19, and wherein the plurality of instructions further cause the one or more processors to generate the voice model based on the audio data.

Example 21 includes the subject matter of any of Examples 12-20, and wherein the audio data corresponds to a first time frame and the speech data corresponds to a second time frame, wherein the first time frame and the second time frame overlap.

Example 22 includes the subject matter of any of Examples 12-21, and wherein the audio data corresponds to a first time frame and the speech data corresponds to a second time frame, wherein the first time frame and the second time frame do not overlap.

Example 23 includes the subject matter of any of Examples 12-22, and wherein to identify the one or more gaps in the audio data comprises to identify a bit in a packet indicative of the presence of the speech code data.

Example 24 includes a method comprising receiving, by a compute device, audio data of a user from an audio input; performing, by the compute device, automatic speech recognition on the audio data to generate speech code data corresponding to the audio data; sending, by the compute device, the speech code data to a remote compute device.

Example 25 includes the subject matter of Example 24, and further including determining, by the compute device, a quality of a connection between the compute device and the remote compute device; and determining, by the compute device, whether the quality of the connection is below a threshold, wherein performing automatic speech recognition on the audio data comprises performing automatic speech recognition on the audio data in response to a determination that the quality of the connection is below the threshold.

Example 26 includes the subject matter of any of Examples 24 and 25, and wherein determining the quality of the connection comprises receiving an indication of the quality of the connection from the remote compute device.

Example 27 includes the subject matter of any of Examples 24-26, and wherein determining, by the compute device, whether the quality of the connection is below a threshold comprises determining, by the compute device, whether the quality of the connection is below a threshold at a first time frame, the method further comprising receiving, by the compute device, additional audio data of the user from the audio input; determining, by the compute device, a quality of the connection at a second time frame different from the first, wherein the audio data is received at a time corresponding to the first time frame, wherein the additional audio data is received at a time corresponding to the second time frame; determining, by the compute device, whether the quality of the connection at the second time frame is below a threshold; and sending, by the compute device, the additional audio data without corresponding speech code data and an indication of a presence of the additional audio data in response to a determination that the quality of the connection at the second time frame is not below the threshold.

Example 28 includes the subject matter of any of Examples 24-27, and wherein the speech code data comprises text corresponding to the audio data.

Example 29 includes the subject matter of any of Examples 24-28, and wherein sending the speech code data to the remote compute device comprises sending the audio data and the speech code data to the remote compute device.

Example 30 includes the subject matter of any of Examples 24-29, and wherein sending the audio data and the speech code data to the remote compute device wherein sending the audio data in a primary connection and the speech code data in an out-of-band connection different from the primary connection.

Example 31 includes the subject matter of any of Examples 24-30, and wherein sending the audio data and the speech code data to the remote compute device wherein sending the audio data and the speech code data in the same connection.

Example 32 includes the subject matter of any of Examples 24-31, and wherein sending the audio data and the speech code data to the remote compute device comprises sending the audio data with a first amount of redundancy and the speech code data with a second amount of redundancy, wherein the second amount of redundancy is greater than the first amount of redundancy.

Example 33 includes the subject matter of any of Examples 24-32, and further including receiving, by the compute device, video data of the user, wherein sending the speech code data to a remote compute device comprises sending the speech code data and the video data to the remote compute device.

Example 34 includes the subject matter of any of Examples 24-33, and wherein performing automatic speech recognition on the audio data comprises applying a speech codec to generate speech code data at a data rate less than 500 bits per second.

Example 35 includes a method comprising receiving, by a compute device and from a remote compute device, audio data and speech code data; identifying, by the compute device, one or more gaps in the audio data; and augmenting, by the compute device, the audio data based on the speech code data to fill the one or more gaps in the audio data.

Example 36 includes the subject matter of Example 35, and wherein the speech code data is incomplete, wherein augmenting the audio data based on the speed code data comprises accessing an autocomplete dictionary to augment the incomplete speech code data.

Example 37 includes the subject matter of any of Examples 35 and 36, and further including updating, by the compute device, the autocomplete dictionary based on the audio data, the speech code data, or both.

Example 38 includes the subject matter of any of Examples 35-37, and wherein accessing the autocomplete dictionary comprises accessing the autocomplete dictionary based on one or more keywords identified in the audio data, the speech code data, or both.

Example 39 includes the subject matter of any of Examples 35-38, and further including updating the autocomplete dictionary based on the one or more identified keywords.

Example 40 includes the subject matter of any of Examples 35-39, and further including determining, by the compute device, a quality of a connection between the compute device and the remote compute device; and transmitting, by the compute device, an indication of the quality of the connection to the remote compute device.

Example 41 includes the subject matter of any of Examples 35-40, and wherein the speech code data comprises text corresponding to the one or more gaps in the audio data.

Example 42 includes the subject matter of any of Examples 35-41, and further including identifying, by the compute device, a voice model corresponding to a speaker of the audio data and the speech code data, wherein augmenting the audio data based on the speech code data comprises augmenting the audio data based on the voice model.

Example 43 includes the subject matter of any of Examples 35-42, and further including generating, by the compute device, the voice model based on the audio data.

Example 44 includes the subject matter of any of Examples 35-43, and wherein the audio data corresponds to a first time frame and the speech data corresponds to a second time frame, wherein the first time frame and the second time frame overlap.

Example 45 includes the subject matter of any of Examples 35-44, and wherein the audio data corresponds to a first time frame and the speech data corresponds to a second time frame, wherein the first time frame and the second time frame do not overlap.

Example 46 includes a compute device comprising means for receiving audio data of a user from an audio input; means for performing automatic speech recognition on the audio data to generate speech code data corresponding to the audio data; means for sending the speech code data to a remote compute device.

Example 47 includes the subject matter of Example 46, and further including means for determining a quality of a connection between the compute device and the remote compute device; and means for determining whether the quality of the connection is below a threshold, wherein the means for performing automatic speech recognition on the audio data comprises means for performing automatic speech recognition on the audio data in response to a determination that the quality of the connection is below the threshold.

Example 48 includes the subject matter of any of Examples 46 and 47, and wherein the means for determining the quality of the connection comprises means for receiving an indication of the quality of the connection from the remote compute device.

Example 49 includes the subject matter of any of Examples 46-48, and wherein the means for determining whether the quality of the connection is below a threshold comprises means for determining whether the quality of the connection is below a threshold at a first time frame, the compute device further comprising means for receiving additional audio data of the user from the audio input; means for determining a quality of the connection at a second time frame different from the first, wherein the audio data is received at a time corresponding to the first time frame, wherein the additional audio data is received at a time corresponding to the second time frame; means for determining whether the quality of the connection at the second time frame is below a threshold; and means for sending the additional audio data without corresponding speech code data and an indication of a presence of the additional audio data in response to a determination that the quality of the connection at the second time frame is not below the threshold.

Example 50 includes the subject matter of any of Examples 46-49, and wherein the speech code data comprises text corresponding to the audio data.

Example 51 includes the subject matter of any of Examples 46-50, and wherein the means for sending the speech code data to the remote compute device comprises means for sending the audio data and the speech code data to the remote compute device.

Example 52 includes the subject matter of any of Examples 46-51, and wherein the means for sending the audio data and the speech code data to the remote compute device wherein the means for sending the audio data in a primary connection and the speech code data in an out-of-band connection different from the primary connection.

Example 53 includes the subject matter of any of Examples 46-52, and wherein the means for sending the audio data and the speech code data to the remote compute device wherein the means for sending the audio data and the speech code data in the same connection.

Example 54 includes the subject matter of any of Examples 46-53, and wherein the means for sending the audio data and the speech code data to the remote compute device comprises means for sending the audio data with a first amount of redundancy and the speech code data with a second amount of redundancy, wherein the second amount of redundancy is greater than the first amount of redundancy.

Example 55 includes the subject matter of any of Examples 46-54, and further including means for receiving video data of the user, wherein the means for sending the speech code data to a remote compute device comprises means for sending the speech code data and the video data to the remote compute device.

Example 56 includes the subject matter of any of Examples 46-55, and wherein the means for performing automatic speech recognition on the audio data comprises means for applying a speech codec to generate speech code data at a data rate less than 500 bits per second.

Example 57 includes a compute device comprising means for receiving, from a remote compute device, audio data and speech code data; means for identifying one or more gaps in the audio data; and means for augmenting the audio data based on the speech code data to fill the one or more gaps in the audio data.

Example 58 includes the subject matter of Example 57, and wherein the speech code data is incomplete, wherein the means for augmenting the audio data based on the speed code data comprises means for accessing an autocomplete dictionary to augment the incomplete speech code data.

Example 59 includes the subject matter of any of Examples 57 and 58, and further including means for updating the autocomplete dictionary based on the audio data, the speech code data, or both.

Example 60 includes the subject matter of any of Examples 57-59, and wherein the means for accessing the autocomplete dictionary comprises means for accessing the autocomplete dictionary based on one or more keywords identified in the audio data, the speech code data, or both.

Example 61 includes the subject matter of any of Examples 57-60, and further including means for updating the autocomplete dictionary based on the one or more identified keywords.

Example 62 includes the subject matter of any of Examples 57-61, and further including means for determining a quality of a connection between the compute device and the remote compute device; and means for transmitting an indication of the quality of the connection to the remote compute device.

Example 63 includes the subject matter of any of Examples 57-62, and wherein the speech code data comprises text corresponding to the one or more gaps in the audio data.

Example 64 includes the subject matter of any of Examples 57-63, and further including means for identifying a voice model corresponding to a speaker of the audio data and the speech code data, wherein the means for augmenting the audio data based on the speech code data comprises means for augmenting the audio data based on the voice model.

Example 65 includes the subject matter of any of Examples 57-64, and further including means for generating the voice model based on the audio data.

Example 66 includes the subject matter of any of Examples 57-65, and wherein the audio data corresponds to a first time frame and the speech data corresponds to a second time frame, wherein the first time frame and the second time frame overlap.

Example 67 includes the subject matter of any of Examples 57-66, and wherein the audio data corresponds to a first time frame and the speech data corresponds to a second time frame, wherein the first time frame and the second time frame do not overlap.

Example 68 includes one or more computer-readable media comprising a plurality of instructions stored thereon that, when executed, causes a compute device to receive, from a remote compute device, audio data and speech code data; identify one or more gaps in the audio data; and augment the audio data based on the speech code data to fill the one or more gaps in the audio data.

Example 69 includes the subject matter of Example 68, and wherein the speech code data is incomplete, wherein to augment the audio data based on the speed code data comprises to access an autocomplete dictionary to augment the incomplete speech code data.

Example 70 includes the subject matter of any of Examples 68 and 69, and wherein the plurality of instructions further cause the compute device to update the autocomplete dictionary based on the audio data, the speech code data, or both.

Example 71 includes the subject matter of any of Examples 68-70, and wherein to access the autocomplete dictionary comprises to access the autocomplete dictionary based on one or more keywords identified in the audio data, the speech code data, or both.

Example 72 includes the subject matter of any of Examples 68-71, and wherein the plurality of instructions further cause the compute device to update the autocomplete dictionary based on the one or more identified keywords.

Example 73 includes the subject matter of any of Examples 68-72, and wherein the plurality of instructions further cause the compute device to determine a quality of a connection between the compute device and the remote compute device; and transmit an indication of the quality of the connection to the remote compute device.

Example 74 includes the subject matter of any of Examples 68-73, and wherein the speech code data comprises text corresponding to the one or more gaps in the audio data.

Example 75 includes the subject matter of any of Examples 68-74, and wherein the plurality of instructions further cause the compute device to identify a voice model corresponding to a speaker of the audio data and the speech code data, wherein to augment the audio data based on the speech code data comprises to augment the audio data based on the voice model.

Example 76 includes the subject matter of any of Examples 68-75, and wherein the plurality of instructions further cause the compute device to generate the voice model based on the audio data.

Example 77 includes the subject matter of any of Examples 68-76, and wherein the audio data corresponds to a first time frame and the speech data corresponds to a second time frame, wherein the first time frame and the second time frame overlap.

Example 78 includes the subject matter of any of Examples 68-77, and wherein the audio data corresponds to a first time frame and the speech data corresponds to a second time frame, wherein the first time frame and the second time frame do not overlap.

Example 79 includes one or more computer-readable media comprising a plurality of instructions stored thereon that, when executed, causes a compute device to receive audio data of a user from an audio input; and perform automatic speech recognition on the audio data to generate speech code data corresponding to the audio data, send the speech code data to a remote compute device.

Example 80 includes the subject matter of Example 79, and wherein the plurality of instructions further cause the compute device to determine a quality of a connection between the compute device and the remote compute device; and determine whether the quality of the connection is below a threshold, wherein to perform automatic speech recognition on the audio data comprises to perform automatic speech recognition on the audio data in response to a determination that the quality of the connection is below the threshold.

Example 81 includes the subject matter of any of Examples 79 and 80, and wherein to determine the quality of the connection comprises to receive an indication of the quality of the connection from the remote compute device.

Example 82 includes the subject matter of any of Examples 79-81, and wherein to determine whether the quality of the connection is below a threshold comprises to determine whether the quality of the connection is below a threshold at a first time frame, wherein the plurality of instructions further cause the compute device to receive additional audio data of the user from the audio input; determine a quality of the connection at a second time frame different from the first, wherein the audio data is received at a time corresponding to the first time frame, wherein the additional audio data is received at a time corresponding to the second time frame; determine whether the quality of the connection at the second time frame is below a threshold; and send the additional audio data without corresponding speech code data and an indication of a presence of the additional audio data in response to a determination that the quality of the connection at the second time frame is not below the threshold.

Example 83 includes the subject matter of any of Examples 79-82, and wherein the speech code data comprises text corresponding to the audio data.

Example 84 includes the subject matter of any of Examples 79-83, and wherein to send the speech code data to the remote compute device comprises to send the audio data and the speech code data to the remote compute device.

Example 85 includes the subject matter of any of Examples 79-84, and wherein to send the audio data and the speech code data to the remote compute device wherein to send the audio data in a primary connection and the speech code data in an out-of-band connection different from the primary connection.

Example 86 includes the subject matter of any of Examples 79-85, and wherein to send the audio data and the speech code data to the remote compute device wherein to send the audio data and the speech code data in the same connection.

Example 87 includes the subject matter of any of Examples 79-86, and wherein to send the audio data and the speech code data to the remote compute device comprises to send the audio data with a first amount of redundancy and the speech code data with a second amount of redundancy, wherein the second amount of redundancy is greater than the first amount of redundancy.

Example 88 includes the subject matter of any of Examples 79-87, and wherein the plurality of instructions further cause the compute device to receive video data of the user, wherein to send the speech code data to a remote compute device comprises to send the speech code data and the video data to the remote compute device.

Example 89 includes the subject matter of any of Examples 79-88, and wherein to perform automatic speech recognition on the audio data comprises to apply a speech codec to generate speech code data at a data rate less than 500 bits per second.

The invention claimed is:

1. A compute device comprising:
   one or more processors; and
   a memory device coupled to the one or more processors comprising thereon a plurality of instructions that, when executed, causes the one or more processors to:
   receive audio data of a user from an audio input;
   perform automatic speech recognition on the audio data to generate speech code data corresponding to the audio data;
   determine a quality of a connection between the compute device and a remote compute device;
   determine whether the quality of the connection is below a threshold; and
   send the speech code data to the remote compute device in response to a determination that the quality of the connection is below the threshold.

2. The compute device of claim 1, wherein to determine the quality of the connection comprises to receive an indication of the quality of the connection from the remote compute device.

3. The compute device of claim 1, wherein to determine whether the quality of the connection is below a threshold comprises to determine whether the quality of the connection is below a threshold at a first time frame, wherein the plurality of instructions further cause the one or more processors to:
   receive additional audio data of the user from the audio input;
   determine a quality of the connection at a second time frame different from the first, wherein the audio data is received at a time corresponding to the first time frame, wherein the additional audio data is received at a time corresponding to the second time frame;
   determine whether the quality of the connection at the second time frame is below a threshold; and
   send the additional audio data without corresponding speech code data and an indication of a presence of the additional audio data in response to a determination that the quality of the connection at the second time frame is not below the threshold.

4. The compute device of claim 1, wherein the speech code data comprises text corresponding to the audio data.

5. The compute device of claim 1, wherein to send the speech code data to the remote compute device comprises to send the audio data and the speech code data to the remote compute device.

6. The compute device of claim 5, wherein to send the audio data and the speech code data to the remote compute device comprises to send the audio data with a first amount of redundancy and the speech code data with a second amount of redundancy, wherein the second amount of redundancy is greater than the first amount of redundancy.

7. The compute device of claim 1, wherein the plurality of instructions further cause the one or more processors to receive video data of the user,
   wherein to send the speech code data to a remote compute device comprises to send the speech code data and the video data to the remote compute device.

8. The compute device of claim 1, wherein to perform automatic speech recognition on the audio data comprises to apply a speech codec to generate speech code data at a data rate less than 500 bits per second.

9. A compute device comprising:
   one or more processors; and
   a memory device coupled to the one or more processors comprising thereon a plurality of instructions that, when executed, causes the one or more processors to:
   receive, from a remote compute device, audio data and speech code data;
   identify one or more gaps in the audio data; and
   augment the audio data based on the speech code data to fill the one or more gaps in the audio data.

10. The compute device of claim 9, wherein the speech code data is incomplete, wherein to augment the audio data based on the speech code data comprises to access an autocomplete dictionary to augment the incomplete speech code data.

11. The compute device of claim 10, wherein the plurality of instructions further cause the one or more processors to update the autocomplete dictionary based on the audio data, the speech code data, or both.

12. The compute device of claim 10, wherein to access the autocomplete dictionary comprises to access the autocomplete dictionary based on one or more keywords identified in the audio data, the speech code data, or both.

13. The compute device of claim 12, wherein the plurality of instructions further cause the one or more processors to update the autocomplete dictionary based on the one or more identified keywords.

14. The compute device of claim 10, wherein the speech code data comprises text corresponding to the one or more gaps in the audio data.

15. The compute device of claim 9, wherein the plurality of instructions further cause the one or more processors to:
   identify a voice model corresponding to a speaker of the audio data and the speech code data,
   wherein to augment the audio data based on the speech code data comprises to augment the audio data based on the voice model.

16. The compute device of claim 15, wherein the plurality of instructions further cause the one or more processors to generate the voice model based on the audio data.

17. The compute device of claim 9, wherein to identify the one or more gaps in the audio data comprises to identify a bit in a packet indicative of a presence of the speech code data.

18. One or more non-transitory computer-readable media comprising a plurality of instructions stored thereon that, when executed, causes a compute device to:
   receive, from a remote compute device, audio data and speech code data;
   identify one or more gaps in the audio data; and
   augment the audio data based on the speech code data to fill the one or more gaps in the audio data.

19. The one or more non-transitory computer-readable media of claim 18, wherein the speech code data comprises text corresponding to the one or more gaps in the audio data.

20. The one or more non-transitory computer-readable media of claim 18, wherein the plurality of instructions further cause the compute device to:
   identify a voice model corresponding to a speaker of the audio data and the speech code data,
   wherein to augment the audio data based on the speech code data comprises to augment the audio data based on the voice model.

21. The one or more non-transitory computer-readable media of claim 20, wherein the plurality of instructions further cause the compute device to generate the voice model based on the audio data.

22. One or more non-transitory computer-readable media comprising a plurality of instructions stored thereon that, when executed, causes a compute device to:
  receive audio data of a user from an audio input;
  perform automatic speech recognition on the audio data to generate speech code data corresponding to the audio data;
  determine a quality of a connection between the compute device and a remote compute device;
  determine whether the quality of the connection is below a threshold; and
  send, in response to a determination that the quality of the connection is below the threshold, the speech code data to the remote compute device.

23. The one or more non-transitory computer-readable media of claim 22, wherein to determine whether the quality of the connection is below a threshold comprises to determine whether the quality of the connection is below a threshold at a first time frame, wherein the plurality of instructions further cause the compute device to:
  receive additional audio data of the user from the audio input;
  determine a quality of the connection at a second time frame different from the first, wherein the audio data is received at a time corresponding to the first time frame, wherein the additional audio data is received at a time corresponding to the second time frame;
  determine whether the quality of the connection at the second time frame is below a threshold; and
  send the additional audio data without corresponding speech code data and an indication of a presence of the additional audio data in response to a determination that the quality of the connection at the second time frame is not below the threshold.

* * * * *